United States Patent [19]

Dickey

[11] Patent Number: 4,687,493
[45] Date of Patent: Aug. 18, 1987

[54] ELECTROSTATIC PARTICLE DISPERSION FOR FLUID MIXTURE SEPARATION AND CHEMICAL CONVERSION

[76] Inventor: Leland C. Dickey, 310 Sawmill La., Apt. 3J, Horsham, Pa. 19044

[21] Appl. No.: 803,631

[22] Filed: Dec. 2, 1985

[51] Int. Cl.$^4$ .............................................. B03C 3/00
[52] U.S. Cl. .............................................. 55/2; 55/5; 55/103; 55/107; 210/748; 423/DIG. 10
[58] Field of Search ............... 204/164, 165, 170, 174, 204/177, 190, 302; 55/2, 5, 103, 107; 210/748; 423/DIG. 10

[56] References Cited

U.S. PATENT DOCUMENTS

| 2,763,125 | 9/1956 | Kadosch et al. | 55/2 |
| 2,924,294 | 2/1960 | Johnstone | 55/107 |
| 3,421,050 | 1/1969 | Topper et al. | 55/103 |
| 3,503,704 | 3/1970 | Marks | 55/107 |
| 3,520,662 | 7/1970 | Marks | 55/107 |
| 3,565,777 | 2/1971 | Lauer | 204/157.49 |
| 3,729,898 | 5/1973 | Richardson | 55/107 |
| 3,757,491 | 9/1973 | Gourdine | 55/107 |
| 3,936,376 | 2/1976 | Centineo | 210/748 |
| 3,958,959 | 5/1976 | Cohen et al. | 55/107 |
| 4,072,477 | 2/1978 | Hanson et al. | 55/10 |
| 4,095,962 | 6/1978 | Richards | 55/107 |
| 4,233,037 | 11/1980 | Pontius et al. | 55/2 |
| 4,345,916 | 8/1982 | Richards et al. | 55/107 |
| 4,398,928 | 8/1983 | Kunsagi | 55/107 |
| 4,435,190 | 3/1984 | Taillet et al. | 55/5 |
| 4,454,016 | 6/1984 | Rabinowitz et al. | 204/302 |
| 4,624,764 | 11/1986 | Mintz et al. | 55/107 |

FOREIGN PATENT DOCUMENTS 247910 1/1972 U.S.S.R. .............................. 210/748

Primary Examiner—Arthur P. Demers

[57] ABSTRACT

A method is disclosed for separating and/or chemically converting components of a fluid mixture. The method comprises imparting an electrostatic charge to an array of fine particles, introducing the particles into a separation vessel, maintaining uniform dispersion of the particles within the vessel by charging the walls of the vessel with the same electrostatic charges then on the particles, causing a mixture to flow into the vessel, holding the fluid mixture in the vessels for a period of time such that at least one of the components of the mixture is sorbed by, reacts with, or reacts because of the catalytic action of the particles, and causing the altered fluid mixture to flow out of the vessel.

6 Claims, No Drawings

ELECTROSTATIC PARTICLE DISPERSION FOR FLUID MIXTURE SEPARATION AND CHEMICAL CONVERSION

BACKGROUND OF THE INVENTION

This invention relates to a process for separating components of a fluid mixture. The invention also relates to a process for chemically converting components of fluid mixtures.

The methods for carrying out fluid mixture separation are legion, including chromatography, distillation, liquid extraction and membrane permeation. However, there are some fluid mixtures that cannot be separated by these techniques and some separations would be very costly if these techniques are used. Furthermore, some of these techniques are not applicable to chemical conversion of components of a fluid mixture. Thus there is a need for a different method of fluid mixture separation which can be carried out more cheaply than known methods in many instances and which can be used for chemical conversion.

Electrostatically charged particles have been used in the past to separate dust and other solid particles which are entrained in a gas. U.S. Pat. No. 2,924,294, patented Feb. 9, 1960, discloses a method wherein solid particles are removed from a gas by introducing small electrostatically charged pellets into the center of a rotating body of the gas. U.S. Pat. No. 4,072,477, patented Feb. 7, 1978, discloses the addition of small water droplets to an electrostatic precipitator wherein the water droplets are given an electrostatic charge just as the dust particles to be removed are also given an electrostatic charge. These and other similar methods are used only to remove solid particles from gases. They are not applicable to the separation and/or chemical conversion of components of a fluid mixture.

SUMMARY OF THE INVENTION

This invention is a method for separating and/or chemically converting components of a fluid mixture. The method comprises imparting an electrostatic charge to an array of fine particles, introducing the particles into a separation vessel having an inlet and an outlet for passage of the fluid mixture therethrough, maintaining uniform dispersion of particles within the vessel by charging the walls of the vessel with the same electrostatic charge as that on the particles, causing a fluid mixture to flow into the vessel through the inlet, holding the fluid mixture in the vessel for a period of time such that at least one of the components of the mixture interacts with the fine particles, and causing the altered fluid mixture to flow out of the vessel through the outlet. In some instances, the component of the fluid mixture which is to be separated is physically sorbed by the fine particles. In other cases, one or more of the components of the fluid mixture may chemically react with the fine particles. In other cases, the fine particles may act as the catalyst for reaction of one or more of the components of the fluid mixture. The process may also include a further separation step wherein the products of reaction are separated from the rest of the fluid mixture.

DETAILED DESCRIPTION OF THE INVENTION

This process has the advantage that it can perform reactions and separations that cannot be done by other methods such as removal of trace contaminants for which normal methods would be too expensive because of the high pressure drop or contact time required. Also, if cheap power is available, this process is more economical than other methods of fluid separation. No support material is necessary, so a sizable surface area of the fine particles is available for contact with the fluid mixture. This increases the efficiency of catalytic activity, as well as dispersal of the heat of reaction otherwise concentrated at the site of catalysis. For some reactive processes, this invention can allow operation at lower temperatures than a conventional, mechanically supported catalytic particle bed because the electric field makes the fine particles more active.

The particles may be charged by any of several methods used to charge particles for electrostatic mineral beneficiation. For instance, the separation vessel may be charged before the particles are introduced thereto. When the particles are introduced, they pick up the charge from the wall when they come into contact with it. Another method involves causing the particles to rub together, such as in a grinder, to impart an electrostatic charge to them. They are then introduced into an electrically isolated separation vessel which picks up the charge from the particles. Another method involves agitating the particles in a fluid bed so they pick up charge. The charged particles are then suspended above the fluid bed by repulsion and the fluid bed itself is charged at the appropriate time. In the case of the mutual contact methods, the particles are separated based on charge before they are used in the separation vessel. Other methods of charging the particles include ion bombardment and contact with a charged roller or grate.

As stated above, the particles could be charged in the reaction or separation vessel itself. If they are charged outside of the vessel, they could be injected into the vessel under gas pressure or forced therein from a source which is held at an even greater potential, relative to the ground, than the separation vessel. A Van de Graff generator or similar machine can charge particles to a large potential.

The separation vessel can be made of any ordinary material, such as steel, suitable for the reaction conditions, but if it is made of dielectric material such as glass or ceramic it will need an internal coating to make it electrically conductive. The charge may be put on the vessel in any convenient manner including attaching it to a source of D.C. voltage such as rectified A.C. power or a battery. The vessel or reactor would have to be protected, for instance by being surrounded by a grounded barrier, to prevent injuries.

The charged particles themselves can be formed from a variety of materials which are capable of receiving an electrostatic charge. For instance, very fine carbon particles are especially useful in the present invention. Also, fine particles of inert noble metals such as silver, gold, platinum, palladium, tungsten, vanadium, zirconium, titanium, etc. are useful in this invention. Aluminum oxides and transition metal oxides such as chromium oxide and the iron oxides are useful as well as other oxides and mixtures of oxides and metals with the metal present as smaller particles embedded on the larger oxide particles. Also useful in this invention are materials which cannot be pelletized and used in most catalytic processes such as pure metals which are too soft to resist the stresses imposed by mechanical supports in conventional fixed beds.

In operation, fine carbon particles, for example, are charged by grinding them in a fluid energy mill and then injected into the separation vessel under gas pressure. The vessel is electrically insulated from grounding by high dielectric piping connections and supports. The vessel is charged with the same charge as that of the particles. The mutual repulsion between the particles and the walls of the vessel holds the particles in place inside the vessel.

Then a flue gas stream, for example, flows into the vessel, through the carbon particles and out of the vessel. The outlet of the vessel is made small in relation to the size of the vessel so that the charge of the vessel can still repel the particles near the outlet. The carbon particles sorb the sorbable species from the flue gas stream, thus acting as a filter. Some of the particles are carried out by the purified flue gas and this causes a loss of charge in the vessel. Intermittent addition of charged particles to replenish those lost in use can be controlled by holding the charged particle stream in balance with the field in the vessel created by the particles equal to that of the supply source. Newly added particles take up a dispersed position in the vessel so as to minimize electrostatic repulsion. Loss of particles from the vessel can be minimized by placing a charged baffle over the outlet.

As stated above, this process is also applicable to reaction systems in which one or more of the components of the fluid mixture react with the particles or a reaction in which the fine particles act as a catalyst for two or more of the components of the fluid mixture. An example of the first type is the removal of $SO_2$ by reaction with calcium carbonate. An example of the second type of reaction system is the reaction of ethylene and other low MW hydrocarbons and oxygen which is catalyzed by silver particles.

I claim:

1. A method for separating components of a fluid mixture which comprises:
   (a) imparting an electrostatic charge to an array of fine particles,
   (b) introducing the particles into a separation vessel having an inlet and outlet for passage of the fluid mixture therethrough,
   (c) maintaining uniform dispersion of the particles within the vessel and maintaining the particles in place by charging the walls of the vessel with the same electrostatic charge as that on the particles,
   (d) causing the fluid mixture to flow into the vessel through the inlet,
   (e) holding the fluid mixture in the vessel for a period of time such that at least one of the components of the mixture is absorbed by the particles, and
   (f) causing the remainder of the fluid mixture to flow out of the vessel through the outlet.

2. The method of claim 1 wherein particles which have absorbed at least one of the components of the fluid mixture are separated from the fluid mixture.

3. A method for chemically converting components of a fluid mixture which comprises:
   (a) imparting an electrostatic charge to an array of fine particles,
   (b) introducing the particles into a separation vessel having an inlet and outlet for passage of the fluid mixture therethrough,
   (c) maintaining uniform dispersion of the particles within the vessel and maintaining the particles in place by charging the walls of the vessel with the same electrostatic charge as that on the particles,
   (d) causing the fluid mixture to flow into the vessel through the inlet,
   (e) holding the fluid mixture in the vessel for a period of time such that at least one of the components of the mixture reacts with the particles, and
   (f) causing the altered fluid mixture to flow out of the vessel through the outlet.

4. The method of claim 3 wherein the reaction products are separated from the fluid mixture.

5. A method for chemically converting components of a fluid mixture which comprises:
   (a) imparting an electrostatic charge to an array of fine particles,
   (b) introducing the particles into a separation vessel having an inlet and outlet for passage of the fluid mixture therethrough,
   (c) maintaining uniform dispersion of the particles within the vessel and maintaining the particles in place by charging the walls of the vessel with the same electrostatic charge as that on the particles,
   (d) causing the fluid mixture to flow into the vessel through the inlet,
   (e) holding the fluid mixture in the vessel for a period of time such that at least one of the components of the mixture react because of the catalytic action of the particles, and
   (f) causing the altered fluid mixture to flow out of the vessel through the outlet.

6. The method of claim 5 wherein the reaction products are separated from the fluid mixture.

* * * * *